No. 709,216. Patented Sept. 16, 1902.
M. C. GOODWIN.
ELECTRIC HOSE COUPLING.
(Application filed Jan. 2, 1902.)
(No Model.)

Witnesses.
H. C. Shaw
Marion Richards.

Inventor.
Marion C. Goodwin
by Verill & Clifford
Attorneys.

UNITED STATES PATENT OFFICE.

MANSON C. GOODWIN, OF PORTLAND, MAINE.

ELECTRIC HOSE-COUPLING.

SPECIFICATION forming part of Letters Patent No. 709,216, dated September 16, 1902.

Application filed January 2, 1902. Serial No. 88,174. (No model.)

*To all whom it may concern:*

Be it known that I, MANSON C. GOODWIN, a citizen of the United States, residing at Portland, in the county of Cumberland and State of Maine, have invented certain new and useful Improvements in Electric Hose-Couplings; and I do hereby declare the following to be a full, clear, and exact description of the invention, such as will enable others skilled in the art to which it appertains to make and use the same.

My invention relates to improvements in electric hose-couplings, and is especially designed to provide a simple and effective coupling for hydraulic hose, and especially for that class of hydraulic hose known as "fire-hose" and through which electric currents for the purpose of signaling are designed to be transmitted. In couplings of this sort as previously constructed the difficulty has been in constructing a coupling in which the current will not be grounded by means of water either running through the hose or the couplings coming in contact with moisture or some other conductor from the outside, for in most of the couplings of this class the couplings themselves are used as a means of transmitting the positive or negative or both electric currents from one length of hose to the other, and also in the previous devices such variations in the construction of the couplings are required as to make it impossible to have the devices applied to the couplings in common and general use.

Figure 1:
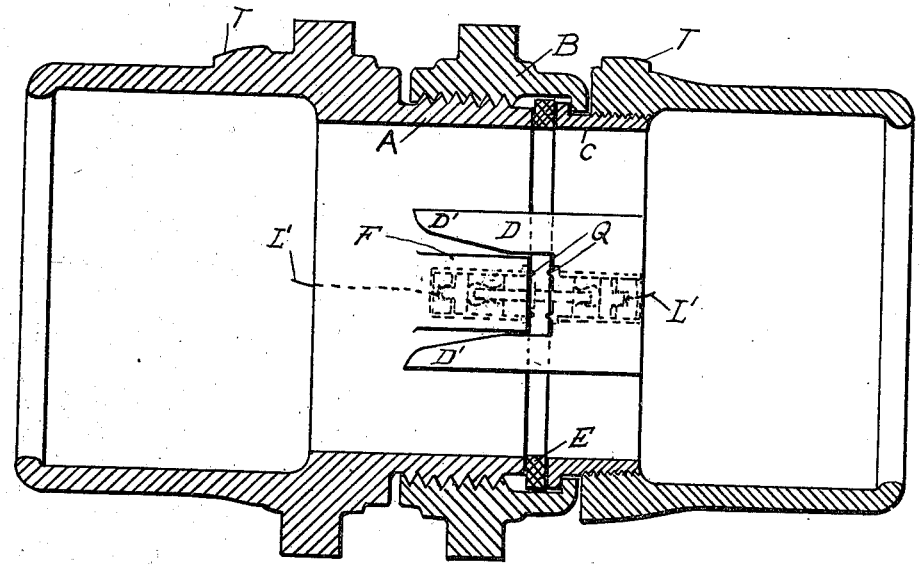
Figure 2:
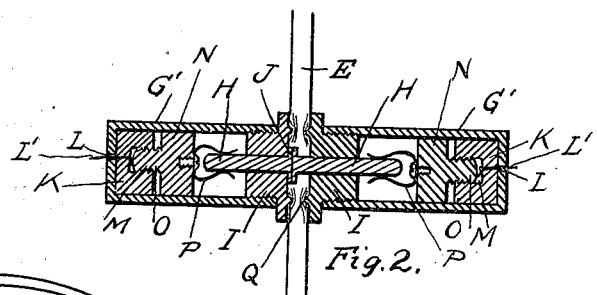
Figures 3, 4:
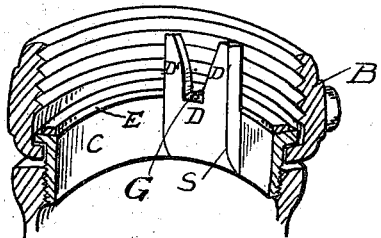

In the drawings herewith accompanying and forming a part of this application, Figure 1 is a vertical section through the male and female members of the coupling, showing my improved device in position. Fig. 2 is a sectional view of the contact-points. Fig. 3 is a perspective view, partly in section, showing one set of tapering posts; and Fig. 4 is a perspective view, partly in section, showing the tapering blocks.

Same letters of reference refer to like parts in all the figures.

In said drawings, A represents the male part, B the female part, of a coupling of ordinary description such as is usually used for coupling lengths of hydraulic hose.

C represents the flange, which is usually made rigid with the stationary part of the female coupling. Attached to said flange and preferably made integral therewith are posts D, spaced apart. For the purpose of insuring a ready coupling of the two parts, the ends of said posts may be made tapering, as shown at D'. These posts are arranged in pairs, but one pair being shown in the drawings, the pairs being placed approximately opposite each other on said flange C.

E represents a gasket, which may be of leather or rubber, which is usually inserted within the female member of the coupling and fits closely upon the flange C. On the male part of the coupling are two blocks F, placed substantially opposite each other and of a width at their lower extremity equivalent to the smallest distance between the posts D of the female member of the coupling. The purpose of these blocks is to serve as a guide for the parts of the coupling when they are put together and also to absolutely insure the bringing the contact-points together when the hose is coupled and to prevent the two parts from sliding one upon the other when the couplings are set up tightly.

Situated between the posts D is a contact-point G. This contact-point consists of a cylindrical-shaped body G', made of hardened rubber or some other non-conductor of electricity, provided with a contact-rod H, which rod extends through the insulated cap I of the cylinder, said rod being provided on its free end with a cap J. Said rod when used in the female member of the coupling extends up through the gasket E, so that the cap J on the contact-rod in the male part when the two parts are set up may positively make the desired contact. In the bottom of said insulated cylinder is a metallic block K, driven to a tight fit, in which is an opening L, into which are brought wires L' for conducting the electrical current through a length of hose. In the top of said block is a threaded socket M. Also adapted to be inserted within said cylinder G' is a metallic plate or block N, provided with a threaded tongue O, which is adapted to be screwed into the threaded socket M tightly upon the free ends of the wires L'. The top of said block or plate N has a plurality of upright springs P thereon, which are adapted to bear against the sides of the contact-rod H, thus completing the means for carrying a current of electricity from the upper end of the contact-rod through the contact to the wires in the lower end of the cylinder, the wires, it being understood, after leaving the contact being covered with some proper insulating material. The cap I of the cylinder G' is also provided with a raised rim Q, which is adapted when the two parts of the couplings are set up to press into the gasket E, thereby reducing to an impossibility the opportunity of moisture reaching the contact-points and grounding the current. I have described but one contact; but it is evident that contacts of this same description are necessary for both the male and female members of the coupling and also are necessary to be inserted in both sets of the blocks and between both sets of the posts in order to serve as a conductor for both the positive and the negative current.

My improved device can be, if desired, readily attached to couplings already made without materially affecting their construction and at the same time form the wedge-shaped construction of the blocks and the tapering bases of the posts, as seen at R and S, respectively. The waterway or open space within the coupling through which water is designed to be forced is not sufficiently diminished to effect the volume of water passing therethrough. I also provide the members of the coupling with markers T, said markers being placed on the outside of the fixed parts thereof and of such form and size as to be readily discovered by a person desiring to couple lengths of hose, even though it be in the dark. These are so arranged that when the members of the coupling are brought together and these markers are in line the blocks and openings between the posts will be in alinement.

When it is desired to couple lengths of hose the couplings of which embody my improved device, the two members of the coupling are brought together and placed in such a position that the markers on the outside of the coupling are in alinement and so that the blocks F are over the openings between the double sets of tapering posts D. The object of giving the posts a taper is to allow of leeway when the couplings are brought together, so that in case the block and posts are not in exact alinement at the start they are brought into exact alinement when the hose is completely coupled. They also prevent the turning of one member of the coupling on the other or any lateral movement which would tend to allow the contact-points to pass by each other, and thus destroy the transmission of the current from one length of hose to another.

It has been found by experience that where leaf-springs or similar devices are used for transmitting the current from one member of the coupling to the other, although they may be thoroughly insulated from the coupling itself, the screwing and unscrewing of the members of the coupling breaks these springs, and thus destroys the efficiency of the device. From the position of the blocks and posts it will be seen that in coupling hose it will be necessary, in case the two members of the coupling are not in such alinement that the block will fit within the post, to give the hose not more than a quarter-turn. This enables the hose supplied with my device to be readily and quickly coupled.

I do not wish to limit myself to the exact mechanical construction of my device as set forth in the drawings and specification, for the same can be modified without departing from the spirit of my invention. Neither do I claim any means for running the wires from the couplings, any of the well-known means being adapted for use with this device.

Having thus described my invention and its use, I claim—

1. An electric hose-coupling, in combination, male and female members, one provided with blocks, the other with posts, contact-points in said blocks and between said posts and means for surrounding said contact-points for preventing the grounding of an electric current.

2. In an electric hose-coupling, in combination, male and female members, the one provided with blocks, the other with tapering posts, the distance between said tapering posts at their bases being equal to the greatest width of the tapering block, contacts insulated from the couplings inserted in said blocks and between said posts and means for preventing moisture from reaching said contacts.

3. In an electric hose-coupling, in combination, male and female members, means for preventing said members from having any movement whatever one upon the other, contacts situated in each member and insulated therefrom and means for preventing moisture from reaching said contact-points.

4. In an electric hose-coupling, in combination, male and female members provided respectively with means for preventing the slipping of one part upon the other when being set up, contacts in each of said members, said contacts being inclosed in a non-conductive cylinder, the head of said cylinder being provided with a raised rim.

5. In an electric hose-coupling, a contact consisting of a casing of non-conductive material, a cap on the upper end of said cylinder, a contact-rod running through said cap, a spring-contact attached to a conductor, in the bottom of said cylinder and means for bringing a flexible conductor into said casing so that an uninterrupted current may be maintained through said cylinder, said cap being provided with a rim on its outer edges.

6. In an electric hose-coupling, in combination, male and female members, a plurality of blocks in the one and plurality of double posts in the other; electrical contacts insulated from said members situated in said blocks and between said double posts, said contact having on its head a raised insulated rim.

7. In an electric hose-coupling, in combination, a male member with a plurality of blocks attached to the inner periphery thereof, a female member, a flange therein, a plurality of double posts attached thereto, electrical contacts in the blocks and between the double posts, the contact-points being surrounded by an insulated cap provided with a raised rim which rim is adapted to sink into a gasket resting on the flange in the female member when the members of the coupling are set up.

In testimony whereof I affix my signature, in presence of two witnesses, this 30th day of December, 1901.

MANSON C. GOODWIN.

In presence of—
NATHAN CLIFFORD,
ELGIN C. VERRILL.